United States Patent [19]
Dworak et al.

[11] 4,420,142
[45] Dec. 13, 1983

[54] MACHINE COMPONENT OF OXIDE CERAMIC MATERIAL

[75] Inventors: Ulf Dworak, Baltmannsweiler; Hans Jud, Esslingen; Hans Olapinski, Aichwald; Dieter Fingerle, Hochdorf; Ulrich Krohn, Leonberg, all of Fed. Rep. of Germany

[73] Assignee: Feldmühle Aktiengesellschaft, Dusseldorf, Fed. Rep. of Germany

[21] Appl. No.: 279,246

[22] Filed: Jul. 1, 1981

[30] Foreign Application Priority Data

Jul. 5, 1980 [DE] Fed. Rep. of Germany ....... 3025596

[51] Int. Cl.³ .............................................. F16K 11/00
[52] U.S. Cl. ................................. 251/368; 137/625.41
[58] Field of Search ........... 251/368; 137/375, 625.17, 137/625.4, 625.41

[56] References Cited

U.S. PATENT DOCUMENTS

| | | | |
|---|---|---|---|
| 2,246,078 | 6/1941 | Rohn et al. ........................ | 251/368 |
| 3,463,192 | 8/1969 | Herion, Jr. ........................ | 251/368 |
| 3,921,659 | 11/1975 | Rudewick ...................... | 137/625.41 |
| 4,292,997 | 10/1981 | Bernat ............................... | 251/368 |

FOREIGN PATENT DOCUMENTS

| | | |
|---|---|---|
| 19335 | 5/1980 | European Pat. Off. . |
| 1282377 | 11/1968 | Fed. Rep. of Germany . |
| 1291957 | 4/1969 | Fed. Rep. of Germany . |
| 1771504 | 9/1972 | Fed. Rep. of Germany . |
| 1796286 | 9/1974 | Fed. Rep. Germany . |
| 2549652 | 5/1977 | Fed. Rep. of Germany . |
| 2744700 | 4/1979 | Fed. Rep. of Germany . |
| 1454755 | 10/1966 | France . |
| 2445305 | 7/1980 | France . |
| 1401371 | 7/1975 | United Kingdom . |

OTHER PUBLICATIONS

Hove and Riley, *Modern Ceramics*, John Wiley and Sons, Inc., 1965, pp. 357–358.
Ryshkewitch; Eugene, *Oxide Ceramics*, Academic Press, 1960, pp. 350, 351, 369–370, 388–391.

*Primary Examiner*—A. Michael Chambers
*Attorney, Agent, or Firm*—Toren, McGeady and Stanger

[57] ABSTRACT

A machine component is disclosed composed of 3.0 to 25 weight percent of zirconium oxide and/or hafnium oxide which are present in the interior of the machine component at room temperature predominantly in the metastable tetragonal modification and at the surface of the machine component in the monoclinic modification, said machine component having a profile bearing ratio of about 10 to 40% and an center line average surface roughness $R_a$ in the contact area of less than 0.3 μm. The machine components of the present invention are leakproof, exhibit good thermal shock durability and exhibit good frictional engagement characteristics for long periods of time.

7 Claims, 1 Drawing Figure

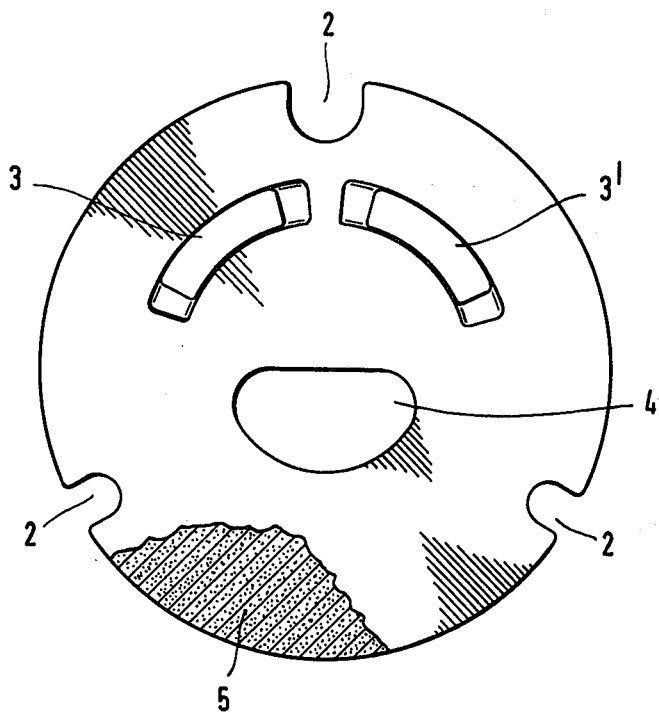

MACHINE COMPONENT OF OXIDE CERAMIC MATERIAL

BACKGROUND OF THE INVENTION

1. Field of the Invention

The present invention relates to a machine component composed of an oxide ceramic material which has a sealing action and is in sliding contact, such as, for example, slip rings for mechanical seals and valve discs for mixing valves, especially valve discs for sanitary water mixers.

2. Description of the Prior Art

Machine components of oxide ceramic materials are presently known. These include, for example, valve discs which are used in control elements consisting preferably of two such valve discs, such as those installed in mixing valves, and in particular, those used in mixers in the sanitary area to regulate the flow of liquid. For example, a ceramic valve seat which consists of 85–99 weight percent of aluminum oxide and 1–4 weight percent of talc, is described in German Auslegeschrift No. 12 82 377. In a preferred modification, such a valve seat contains 6 weight percent of kaolin with an appropriate reduction in the aluminum oxide content.

French Pat. No. 14 54 755 discloses the manufacture of such valve parts from mixtures which contain 35–70 weight percent of zirconium oxide as well as 7 to 30 weight percent of calcium- and zirconium silicate, 0 to 30 weight percent of magnesium- and zirconium silicate, 0 to 25 weight percent of potter's clay and 0 to 25 weight percent of kaolin.

The advantage of these known ceramic valve discs lies in their improved abrasion resistance and in the greater resistance towards erosion and corrosion relative to valve parts manufactured from hard metals. According to a further proposal such as that in German Auslegeschrift No. 12 91 957, the sealing effect of valve discs composed of 95 to 100 weight percent of aluminum oxide, 0 to 3 weight percent of talc and 0 to 3 weight percent of kaolin is improved by lapping and polishing the engaged sides of the valve discs so that they have a flatness of three light bands and a surface finish with a root mean square value (mean geometric roughness) of less than 10.

Besides these reference quantities, which characterize the quality of a ceramic machine part, such as, a valve sealing disc and a slip ring, the previously known machine components are judged by the profile bearing ratio. According to DIN 4762, the profile bearing ratio known in various technological areas in which the evaluation of surface quality plays an important role, is understood to be the ratio of the bearing length to the reference length. The manufacture of leakproof machine components being in sliding contact was previously based on achieving the necessary leakproofness by providing a high profile bearing ratio. In actual fact, a previously known valve discs and slip rings, the percentage of profile bearing length to total length is greater than 70 percent. However, as the profile bearing length to the total length increases, the force required, for example, for mutually displacing two engaged valve discs, also increases. As a result of the high profile bearing ratio, a high displacement force is therefore also required in the known valve discs.

In order to make up for the disadvantage of the high displacement force required, the art has resorted to lubricating the space between the valve discs with a grease which is usually based on silicone. The grease is initially introduced in so-called grease pockets, which are recesses in the surface of the valve discs. However, because of the effect of water, the action of the grease does not last and eventually disappears. Consequently, after this point is reached, a higher displacement force must be employed to use the device. This results in increased wear, because the impurities in the water, such as, for example, sand, increasingly damage the smooth surface of the flat valve discs, which lie on top of one another.

This is particularly disadvantageous in, for example, a sanitary mixing valve and especially an older valve. Thus, a higher displacement force makes it impossible to achieve fine control and mixing of hot and cold water flows when first attempted, and under certain circumstances, the adjustment will have to be repeatedly corrected.

Reducing the profile bearing ratio of the valve discs by grinding with a coarser grain of diamond, has also been attempted. This action also did not have the desired effect because the sealing action of the control elements falls off with the decreased proportion of structural support, e.g., less than 40%, produced in this manner. The disadvantages of previously known slip rings lie in the fact that the dry friction increases with too high a ratio of profile bearing length to total length and this creates dry operating temperatures of more than 300° C.

BRIEF DESCRIPTION OF THE DRAWING

The FIGURE shows a machine component made of an oxide ceramic material in the form of a valve sealing disc.

SUMMARY OF THE INVENTION

We have discovered a ceramic composition for machine components which are frictionally engaged and are completely leakproof but, nevertheless, can be displaced easily relative to the machine parts with which they are engaged. Because they can be adjusted more easily, valve discs, manufactured in accordance with the invention, possess improved metering performance and this capability is maintained even after a long period of operation. Machine components in accordance with the present invention exhibit good thermal shock durability. Particularly, slip rings show improved resistance to seizure, while, at the same time, having a lower dry operating temperature.

More particularly, the machine component of the present invention is composed of:

(a) 3.0 to 25 weight percent of zirconium oxide and/or hafnium oxide, which are present in the interior of the machine component at room temperature predominantly in the metastable tetragonal modification and at the surface of the machine component in the monoclinic modification; and has (b) a profile bearing ratio of 10 to 40 percent;

(c) a center line average roughness $R_a$ in the contact area of less than 0.3 μm For purposes of simplification, the invention is described hereinafter using an example in which zirconium oxide is used. However, the description applies equally to hafnium oxide, particularly since commercially available types of zirconium oxide frequently contain traces of hafnium oxide.

The present invention is based on the property of zirconium and/or hafnium oxide to convert at temperatures below about 1100° C. from the metastable, tetragonal modification. Recently, as described in German Offenlegungsschrift 27 44 700, it was proposed to use a sintered material based on dense, non-metallic hard materials, such as, high melting metal carbides, metal nitrides, metal borides and metal oxides. While the objective was completely different, the property of phase conversion of the zirconium and/or hafnium oxide was also utilized. Thus, the desire here is to improve the toughness and bending strength of such sintered materials in which fine particles of zirconium and/or hafnium oxide are intercalated or dispersed and, in response to mechanical stresses, converted from the metastable, tetragonal modification into the monoclinic form, whereby the stresses are reduced by this phase conversion.

The outstanding effect achieved with the present invention is based on the fact that the zirconium oxide is present in the monoclinic modification at the surface of the machine component. In this connection, the surface is understood to be the functional area which is in sliding contact with another machine component. In the case of a valve disc, the other component would be, for example, the surface of a further valve disc. In the case of a slip ring, it is a machine component which lies against the front surface of the slip ring. This can be manufactured, for example, from a self-lubricating sliding material, such as, carbon or phenolic resin, or even a machine component manufactured from the same material as the slip ring. The conversion from the metastable, tetragonal modification is accomplished by the surface finishing which follows the sintering, the example, by the grinding and lapping or by the mechanical stresses which arise during these processes. An explanation as to why the present composition possesses the above-stated advantages over known machine components, such as, for example, valve discs of 99 weight percent aluminum oxide with slight additions of magnesium oxide, is not yet complete in all details, but presumably is as follows:

In the case of the known machine components, achieving a lesser ratio of profile bearing length to total length is linked to a relatively coarse finishing (coarse abrasive grain), which leads to high values of center line average roughness $R_a$ and finally to problems with leakproofness.

In the case of the inventive machine components, the desired ratio of profile bearing length to total length, for the required center line average roughness value $R_a$ of 0.1 μm, for example, can be regulated by the composition of the material. For a given mechanical engagement, microexcavations (voids) develop as a result of the stress-reducing phase conversion of the dispersed or intercalated zirconium oxide particles lying at or immediately below the surface. In so doing, the size of the grain excavations (voids) can be controlled by the shape and the number of the grains, the grain distribution and the amount of dispersed or intercalated zirconium oxide. It is thus possible to achieve a desired roughness in conjunction with a desired profile bearing ratio, which could not previously be done.

Accordingly, there is a fundamental difference between the surfaces of the inventive composition and those of the known machine components. The known machine components have "larger" flat surfaces, which are interrupted only occasionally by a few indentations which are, however, "larger". On the other hand, the microstructure of the inventive machine components can be described as being a large number of peaks and valleys which differ exceedingly little from the depth of the excavations (voids) of the known machine components.

The flatness of the inventive machine components is entirely comparable with that of the known machine components. On the other hand, the roughness, as defined by the center line average roughness $R_a$ according to DIN 4762, is considerably less. However, the essential difference between the inventive machine components and those previously known is the profile bearing ratio, which is reduced approximately to an eighth in the former.

In accordance with DIN 4762, the profile bearing ratio tp is determined by evaluating profile sections. In the case of surfaces with extremely fine excavations (voids) or recesses in the range of less than 1 μm, the use of this procedure is no longer meaningful, because the probe needle used for determining the profile section, has a radius of 3 μm and is not capable of resolving this degree of fineness.

Because the inventive machine components have a center line average roughness of less than 0.3 μm, the profile bearing ratio is determined not by the said DIN Standard, but by evaluating photographs (incident light microscopy). In this procedure, all recesses in the surface (all regions which are not level) appear as dark zones because light is reflected back from them in a different direction.

In the case of the inventive machine components, the proportion of profile bearing ratio is therefore always defined, in analogy to DIN 4762, as $$tp = 100 \frac{\ln}{1} (\%)$$

ln = bearing length = bright length,
l = total length.

For each evaluation, 10 reference lengths of 0.5 mm are used.

Because of the lesser ratio of profile bearing length to total length, the friction between an inventive machine component and a further machine component engaging the inventive machine component, is considerably less.

Taking as an example a control element whose valve discs consists of the inventive machine components, it surprisingly turns out that the leakproofness of the control element is entirely comparable with the leakproofness of a control element, which is equipped with the previously known valve discs. The present invention is therefore the first to succeed in overcoming the existing preconceived idea that a high degree of leakproofness of control elements manufactured from ceramic valve discs, can be achieved only of the valve discs have a high profile bearing length to total length.

A further advantage of the inventive machine components, resulting from the novel microstructure of the surface, is that they can be used without any additional lubricant and their ability to effectively function is fully retained even after a long period of time.

In a particularly preferred embodiment, the inventive machine components contain 7 to 16 weight percent of zirconium oxide.

The center line average roughness value $R_a$ preferably lies between 0.1 and 0.03 μm.

The inventive machine components may contain as other oxide ceramic materials, aluminum oxide, titanium oxide, and mullite. Of these, aluminum oxide is especially preferred and is advantageously present in amounts of at least 75 weight percent. To achieve the most desired characteristics, a particle size of less than 5 μm for the aluminum oxide and a particle size of 0.2 to 2 μm for the zirconium oxide are best. Slight amounts of grain growth inhibitor and of a sintering aid may be added to the aluminum oxide, the addition of 0.05 to 0.25 weight percent of magnesium oxide being particularly suitable.

Externally, the inventive machine components differ from those previously known in that the surface has a duller finish from the high-gloss appearance of the previously known machine components. The external differences, which can be easily seen with the naked eye, may be attributed to differences in the microstructure of the surface. Thus, a higher profile bearing ratio provides a high-gloss surface, while a lesser ratio of profile bearing length to total length with a larger number of excavations (voids) having only a very slight depth, endows the surface of the inventive machine components with a dull appearance.

This different type of structure in the surface can only be achieved if the surface is so finished that a conversion of the dispersed or intercalated zirconium oxide into the monoclinic form actually does take place in the surface of the inventive machine components. During the finishing with diamond grains (grinding and lapping), this conversion of the dispersed or intercalated zirconium oxide particles in the surface or immediately below the surface takes place because of the stress-induced phase conversion due to the development of high mechanical and thermal stresses on the dispersed or intercalated zirconium oxide particles as well as on their immediate surroundings.

In contrast to this, the dispersed or intercalated zirconium oxide particles which are deeper in the interior of the machine components, remain in their metastable tetragonal modification. This is because, on the one hand, the mechanical and thermal stresses, applied during the grinding and lapping process, are greatly decreased at greater depths and, on the other hand, the conversion of these tetragonal zirconium oxide particles into the monoclinic modification, which is associated with an increase in volume, is hindered by the great pressure exerted on the completely immersed particles by the remaining components of the material.

The FIGURE shows on a scale of 2.4:1 a machine component in the form of a valve sealing disc formed from the composition of the present invention. At the edge, the valve disc 1 has pass-through openings 2, 3 and 3′ for the liquid flows that are to be mixed. Opening 4 is the outflow aperture for the mixed liquid flow. 5 represents, in schematic form, the interior of the valve disc, in which there is present at room temperature, the embedded zirconium oxide in metastable tetragonal modification.

The following examples illustrate the present invention.

EXAMPLE 1

Zirconium silicate powder (ZrSiO₄, 300 g) with an average grain size of less than 5 μm and 700 g of aluminum oxide powder (Al₂O₃) with an average grain size of less than 3 μm, are mixed and milled with the addition of water in a highly efficient milling unit, a powder mixture with a specific surface area of ca. 13 m²/g being obtained. After the addition of a water-soluble binder, the resulting granulate is molded into valve discs at a pressure of 1000 kg/cm². The shape of the valve disc corresponds to that shown in the FIGURE.

The discs are fired into dense bodies for 3 hours in a gas-heated furnace at a temperaure of 1550° C. As a result of the conversion reaction

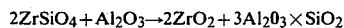

$$2ZrSiO_4 + Al_2O_3 \rightarrow 2ZrO_2 + 3Al_2O_3 \times SiO_2$$

the final composition of the bodies was: mullite + zirconium oxide as well as excess aluminum oxide.

After lapping with 5 μm diamond grain on a grooved, flat steel disc, the valve discs have a dull surface with an extremely low profile bearing ratio, which was determined by light microscopical methods to be 15%. The center line average roughness $R_a$ was measured to be 0.05 μm.

EXAMPLE 2

An aluminum oxide powder (900 g) of average particle size less than 5 μm which is suitable for the preparation of sintered, highly dense and finely particulate Al₂O₃ ceramics and to which 0.1 weight percent of magnesium oxide had been added, is milled and mixed with the addition of water with 100 g monoclinic (unstabilized) zirconium oxide powder with an average particle size of less than 1 μm.

The milled strip is spray dried with the addition of a conventional, water-soluble binder. The granulate, so obtained, is molded at a pressure of ca. 1500 kg/cm² in a hydraulic press to a figure corresponding to the valve disc of the drawing.

The valve disc is thoroughly sintered for 5 hours in a gas-heated furnace at a temperature of 1600° C.

After a lapping procedure carried out according to the procedure in Example 1, the valve discs have a dull surface with a 20% profile bearing ratio and a center roughness $R_a$ of 0.08 μm. The flatness of the finished valve discs is less than 2 light bands.

In a suitable test apparatus in which the flows of hot and cold water can be interchanged abruptly and in which the conditions simulate those in a sanitary mixing valve, the thermal shock behavior of a valve disc, prepared as described in Example 2, was compared with that of a valve disc of pure aluminum oxide and similar shape. The thermal shock resistance of the pure aluminum oxide disc was about ΔT 100° C., while the valve disc of Example 2 had a thermal shock resistance of ΔT 110° C.

An investigation of the displacement force or of the displacement moment gave the following values for valve discs produced according to Example 2 and FIG. 1 and those from pure aluminum oxide ceramic:

|                         | MV (kg × cm) | Fv (kg)            |
|-------------------------|--------------|--------------------|
| Pure aluminum oxide     | 6.50         | 24.3 release values|
| ceramic                 | 4.50         | 5.6 sliding values |
| Valve disc according    | 2.00         | 8.5 release values |
| to Example 2            | 1.50         | 2.5 sliding values |

MV = Displacement moment (kg × cm)
Fv = Vertical displacement (kg)

The displacement forces were tested in an apparatus, developed for this purpose, with water at 13.5° C. or 60° C. The values determined refer only to friction pairing, that is, frictional losses due to the mechanics of the valve were deducted. The discs were pressed against each other with a force of 30 kg. For the measurement, discs were used which previously had been activated for 200,000 cycles, corresponding to a use of about 10 years.

We claim:

1. A machine component for sliding contact and sealing action with and structural support of another component comprising said machine component containing from about
   (a) 3.0–25 weight percent of zirconium oxide, hafnium oxide or mixtures thereof which are present at room temperature, predominantly in the metastable, tetragonal modification, in the interior of the machine component and, in the monoclinic modification, at the surface of the machine component;
   (b) a structural support section expressed as profile bearing ratio of 10 to 40%; and
   (c) an center line average surface roughness $R_a$ of less than 0.3 μm.

2. The machine component of claim 1 wherein the proportion of zirconium oxide or hafnium oxide lies between about 7 and 16% by weight.

3. The machine component of claim 1 or 2 wherein the average roughness $R_a$ lies between about 0.1 and 0.03 μm.

4. The machine component of claim 1 or 2 wherein the aluminum oxide content is at least about 75 weight percent.

5. The machine component of claim 1 or 2 in the form of a slip ring for axially sealing a plain bearing.

6. The machine component of claim 1 or 2 in the form of a valve disc for mixing valves.

7. The machine component of claim 1 or 2 in the form of a valve disc for sanitary water mixers.

* * * * *